(12) United States Patent
Kim

(10) Patent No.: US 10,175,736 B2
(45) Date of Patent: Jan. 8, 2019

(54) TOUCH PANEL AND A WIRELESS INPUT APPARATUS AND MOBILE TERMINAL INCLUDING TOUCH PANEL

(71) Applicant: LG ELECTRONICS INC., Seoul (KR)

(72) Inventor: Younghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 15/022,387

(22) PCT Filed: Jun. 18, 2014

(86) PCT No.: PCT/KR2014/005348
§ 371 (c)(1),
(2) Date: Mar. 16, 2016

(87) PCT Pub. No.: WO2015/041400
PCT Pub. Date: Mar. 26, 2015

(65) Prior Publication Data
US 2016/0224086 A1    Aug. 4, 2016

(30) Foreign Application Priority Data
Sep. 23, 2013 (KR) .......... 10-2013-0112707
Mar. 20, 2014 (KR) .......... 10-2014-0032522

(51) Int. Cl.
*G06F 1/26* (2006.01)
*G06F 3/044* (2006.01)
(Continued)

(52) U.S. Cl.
CPC .......... *G06F 1/266* (2013.01); *G06F 3/03545* (2013.01); *G06F 3/044* (2013.01);
(Continued)

(58) Field of Classification Search
CPC .... G06F 1/266; G06F 3/03545; G06F 3/0414; G06F 3/0416; G06F 3/044; G06F 3/046; G06F 2201/04106
(Continued)

(56) References Cited

U.S. PATENT DOCUMENTS 6,014,058 A * 1/2000 Iga .................. H03G 3/348
                                              330/136
2009/0040191 A1* 2/2009 Tong .................. G06F 3/044
                                              345/174
(Continued)

FOREIGN PATENT DOCUMENTS

KR   10-2012-0135468 A   12/2012
KR   10-2013-0097569 A    9/2013
KR   10-2013-0139256 A   12/2013

*Primary Examiner* — Mark Regn
(74) *Attorney, Agent, or Firm* — Birch, Stewart, Kolasch & Birch, LLP

(57) ABSTRACT

There is disclosed a touch panel, a mobile terminal and a wireless input apparatus applied to the touch panel and the mobile terminal and the touch panel includes a cover unit having a touchable front surface and a rear surface opposite to the front surface, a touch sensing unit provided under the back surface to sense a preset touch signal, and magnetic field generation unit provided under edges of the touch sensing unit to generate a magnetic field.

6 Claims, 9 Drawing Sheets

(51) Int. Cl.
   *G06F 3/046*      (2006.01)
   *G06F 3/0354*     (2013.01)
   *G06F 3/041*      (2006.01)

(52) U.S. Cl.
   CPC ............ *G06F 3/046* (2013.01); *G06F 3/0414* (2013.01); *G06F 3/0416* (2013.01); *G06F 2203/04106* (2013.01)

(58) Field of Classification Search
   USPC ........................................................ 345/173
   See application file for complete search history.

(56) References Cited

U.S. PATENT DOCUMENTS

| | | | |
|---|---|---|---|
| 2010/0053113 | A1 | 3/2010 | Wu et al. |
| 2012/0062497 | A1 | 3/2012 | Rebeschi et al. |
| 2012/0169642 | A1 | 7/2012 | Lee |
| 2012/0262407 | A1* | 10/2012 | Hinckley ................ G06F 3/038 345/173 |
| 2012/0306824 | A1* | 12/2012 | Horie ................ G06F 3/03545 345/179 |
| 2013/0222294 | A1* | 8/2013 | Choi ....................... G06F 3/041 345/173 |

\* cited by examiner

[Fig. 1]
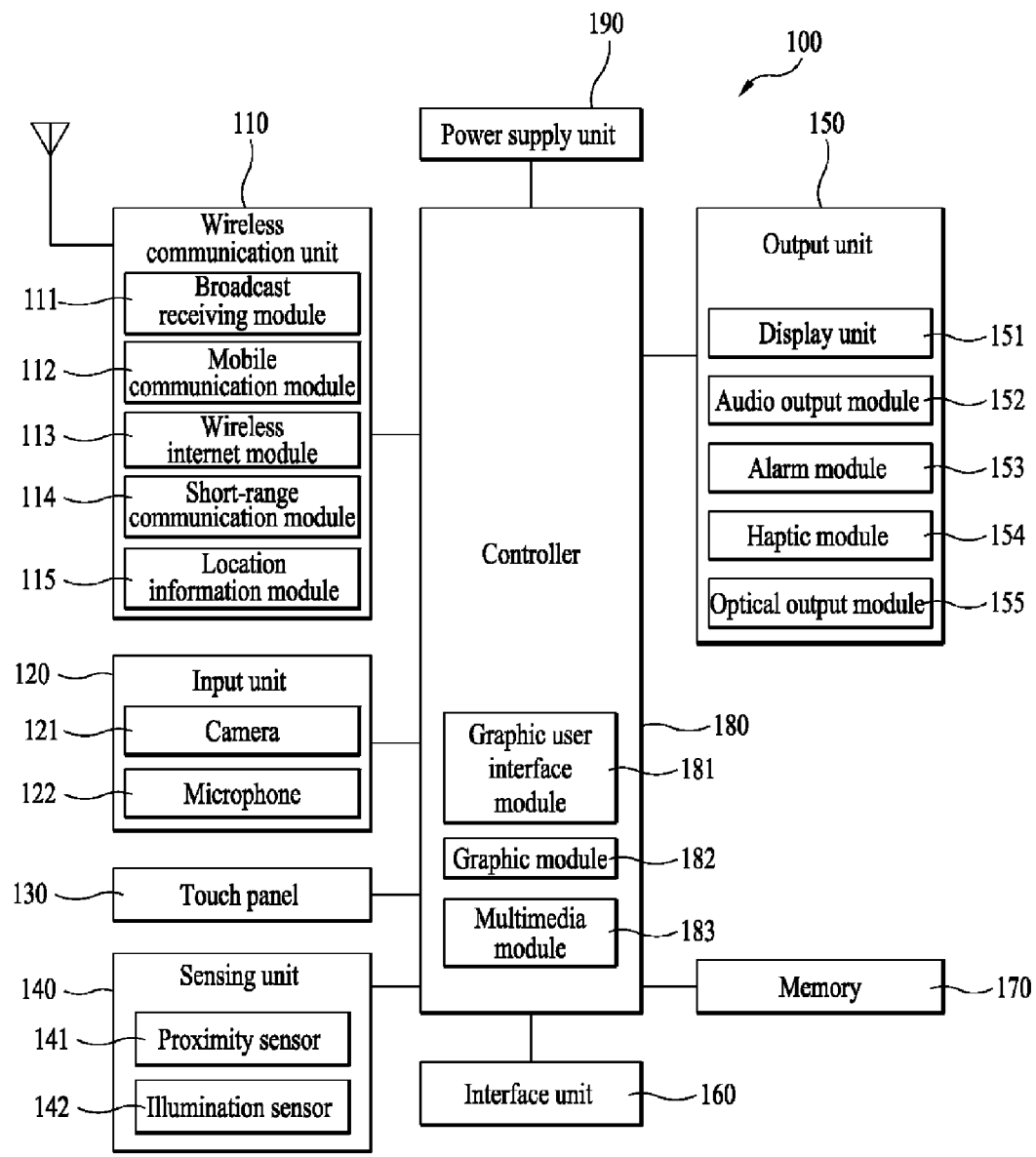

[Fig. 2a]
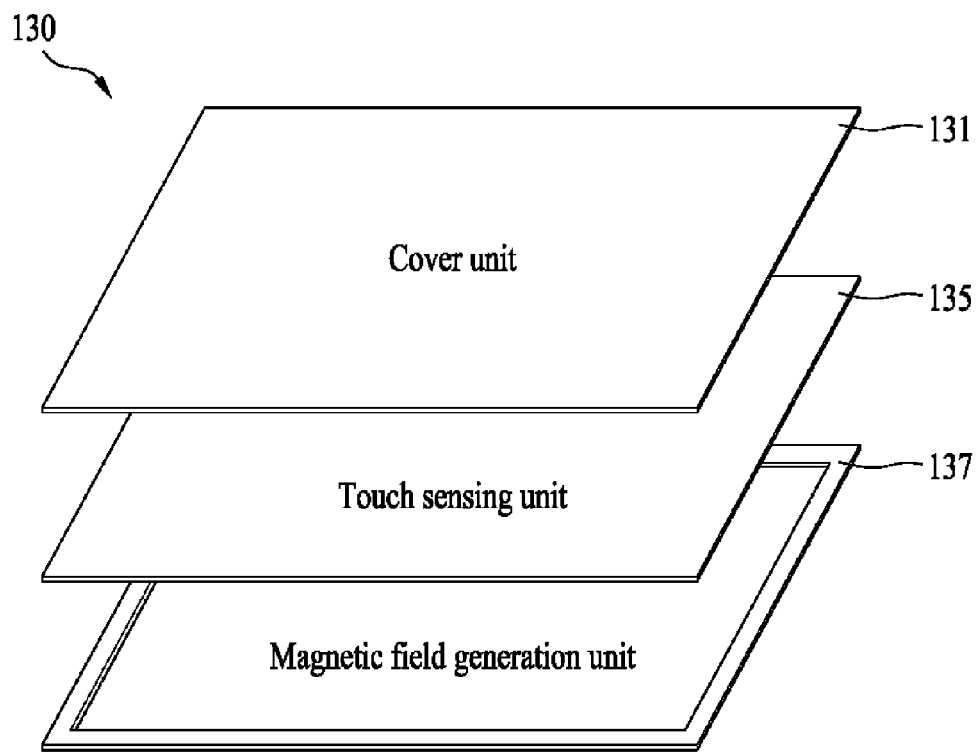
[Fig. 2b]
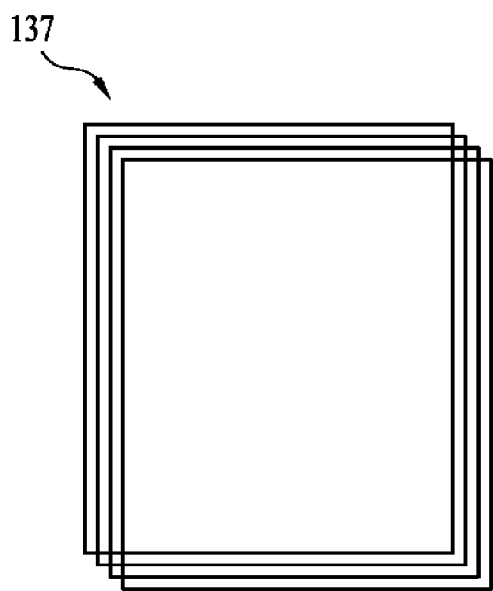

[Fig. 3a]
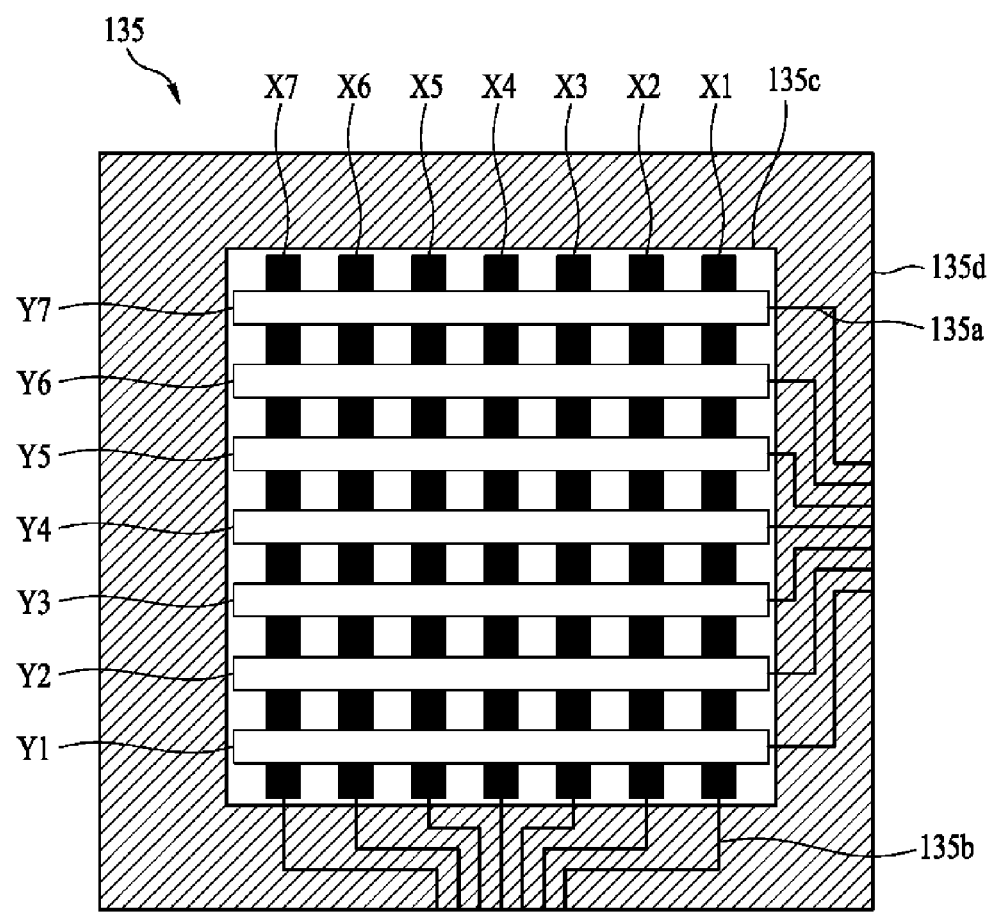
[Fig. 3b]
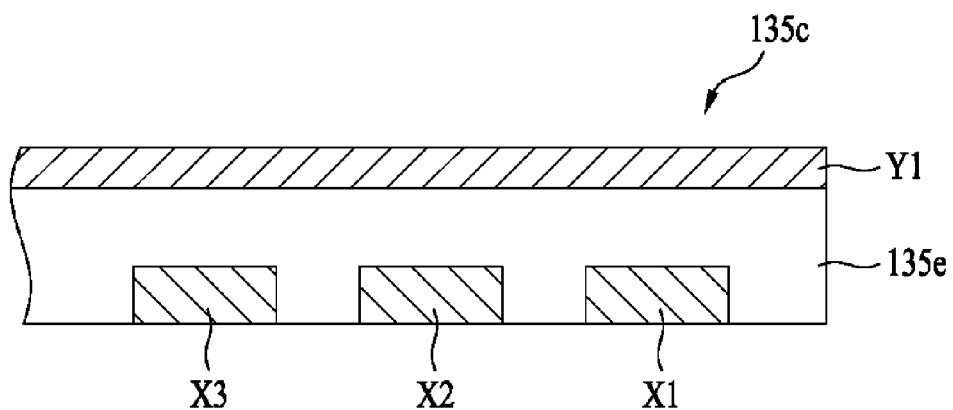

[Fig. 4]
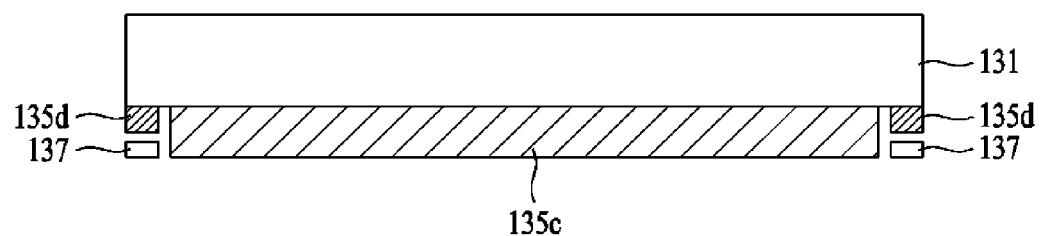
[Fig. 5]
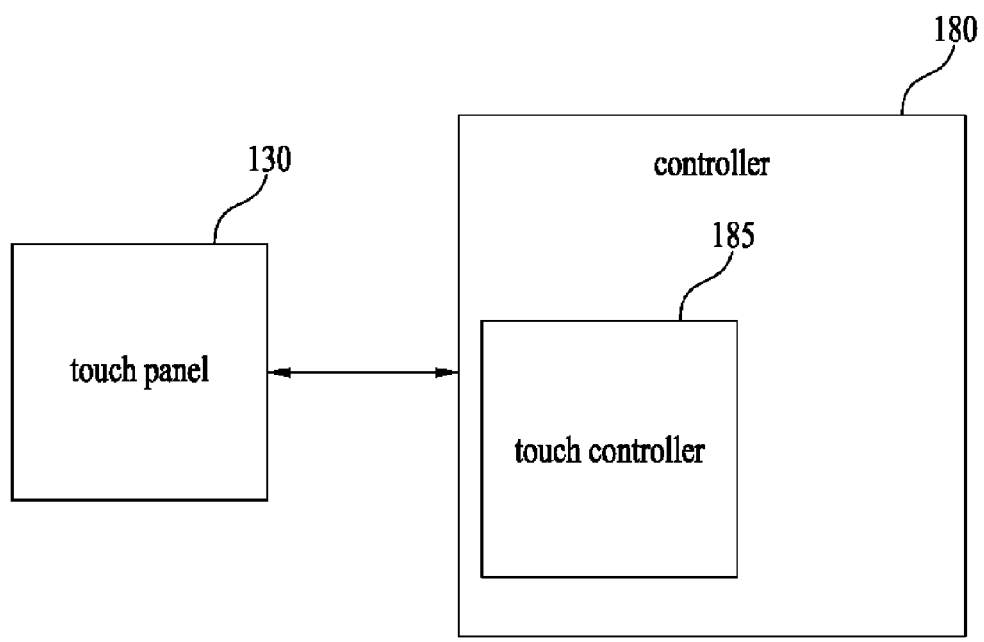

[Fig. 6]
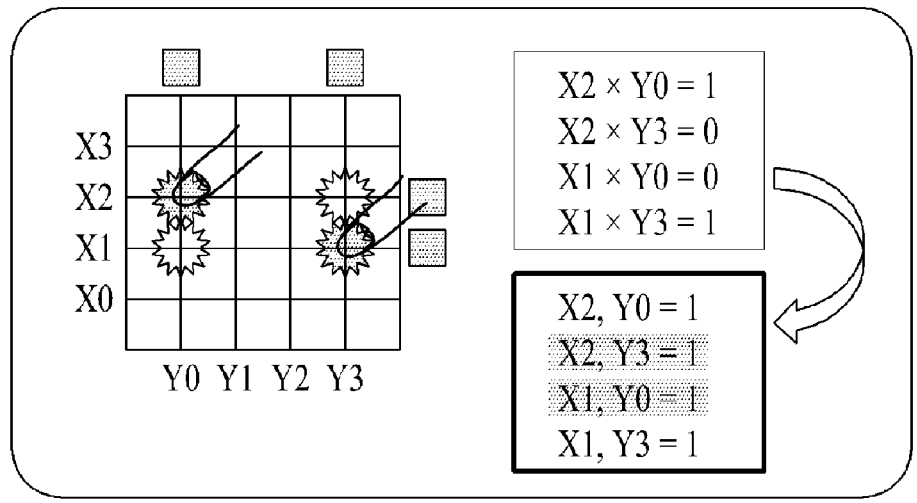
(a)
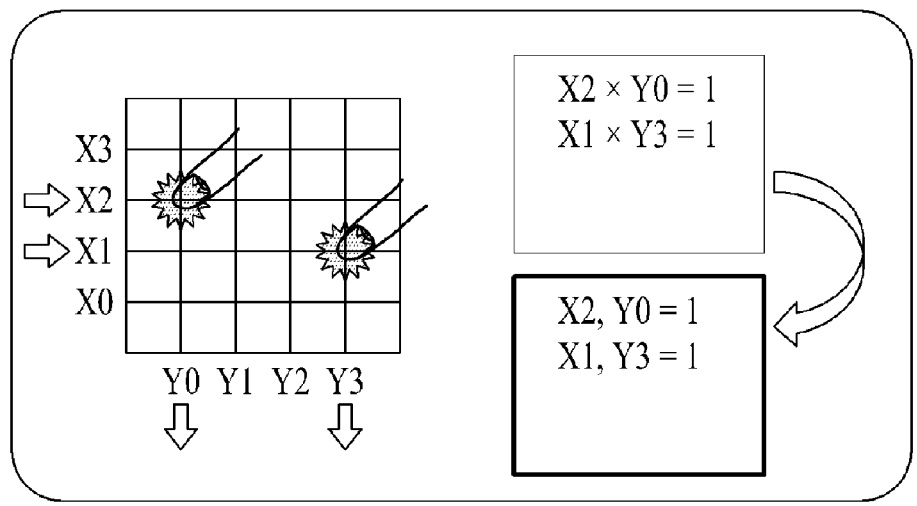
(b)

[Fig. 7]
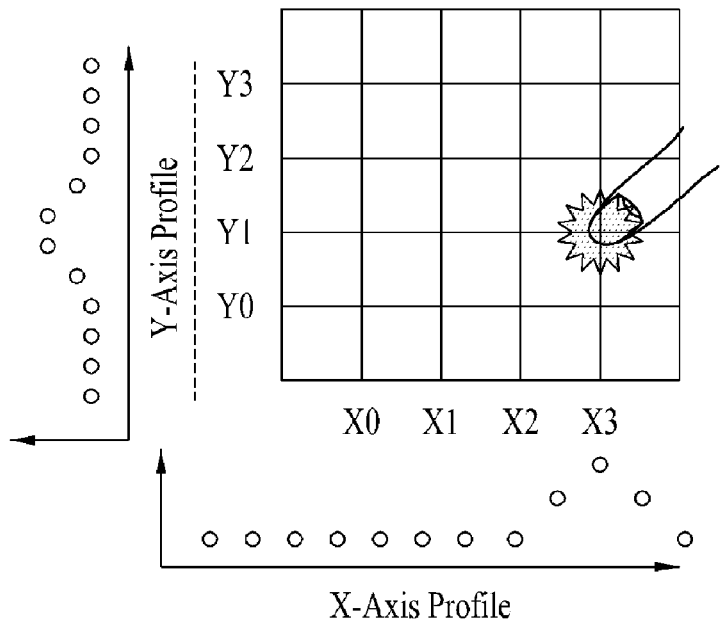
[Fig. 8]
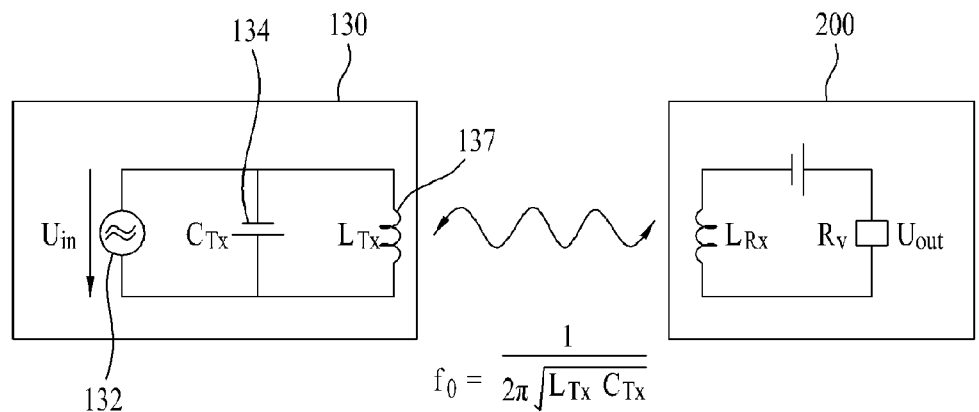
[Fig. 9a]
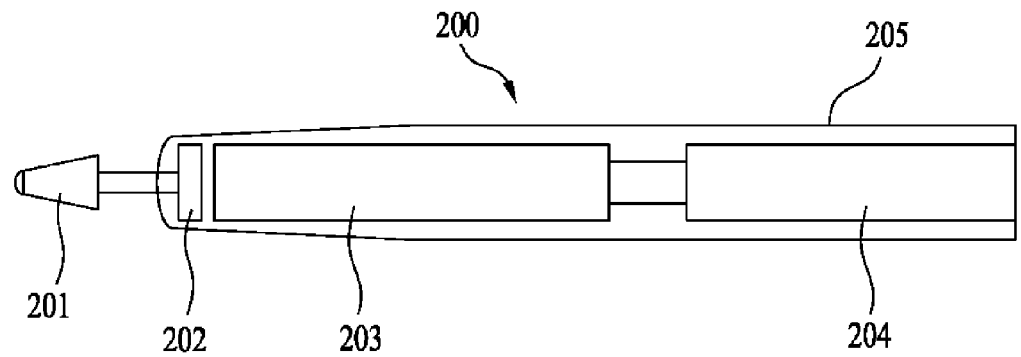

[Fig. 9b]
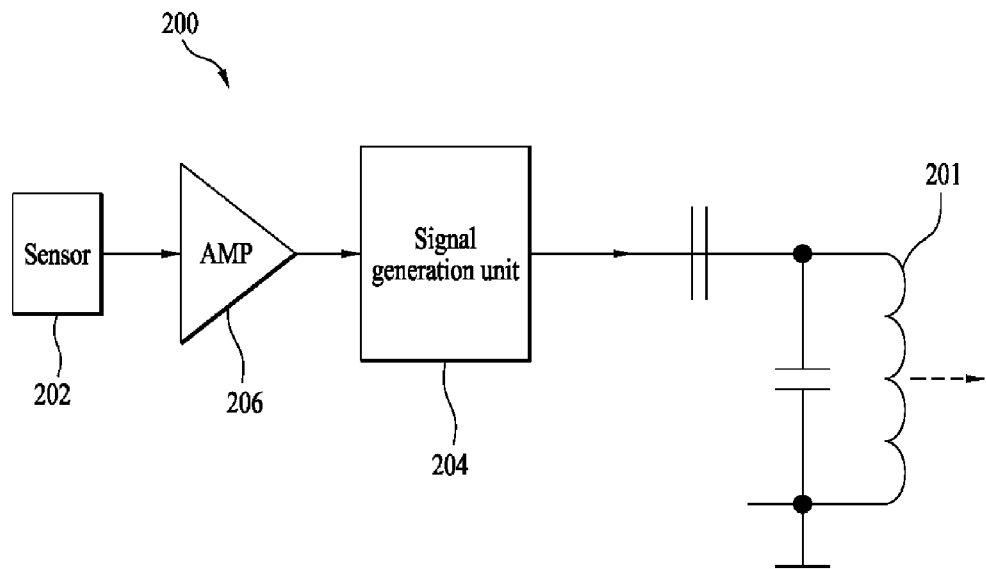
[Fig. 10a]
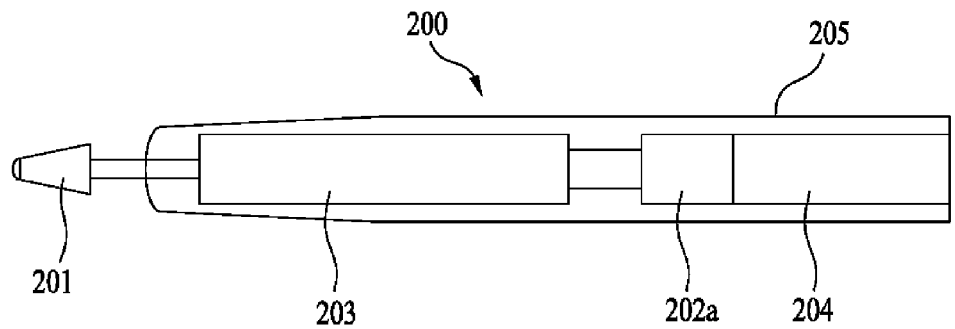
[Fig. 10b]
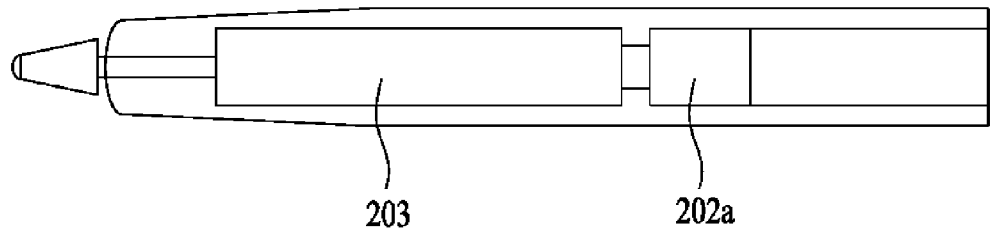

[Fig. 11]
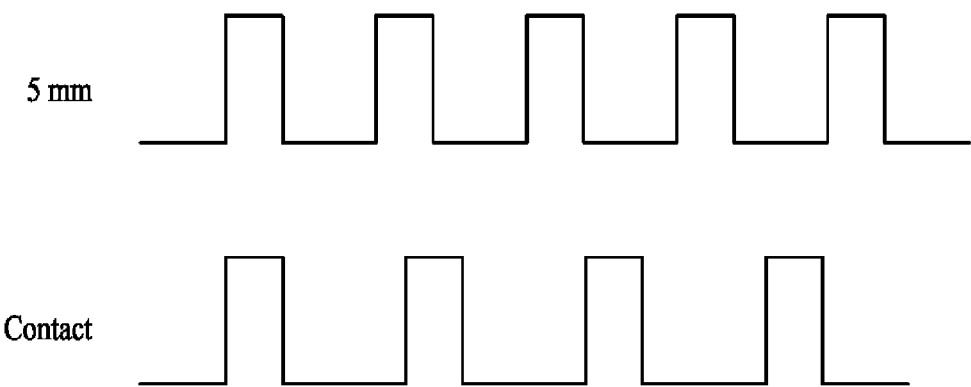
5 mm
Contact
[Fig. 12]
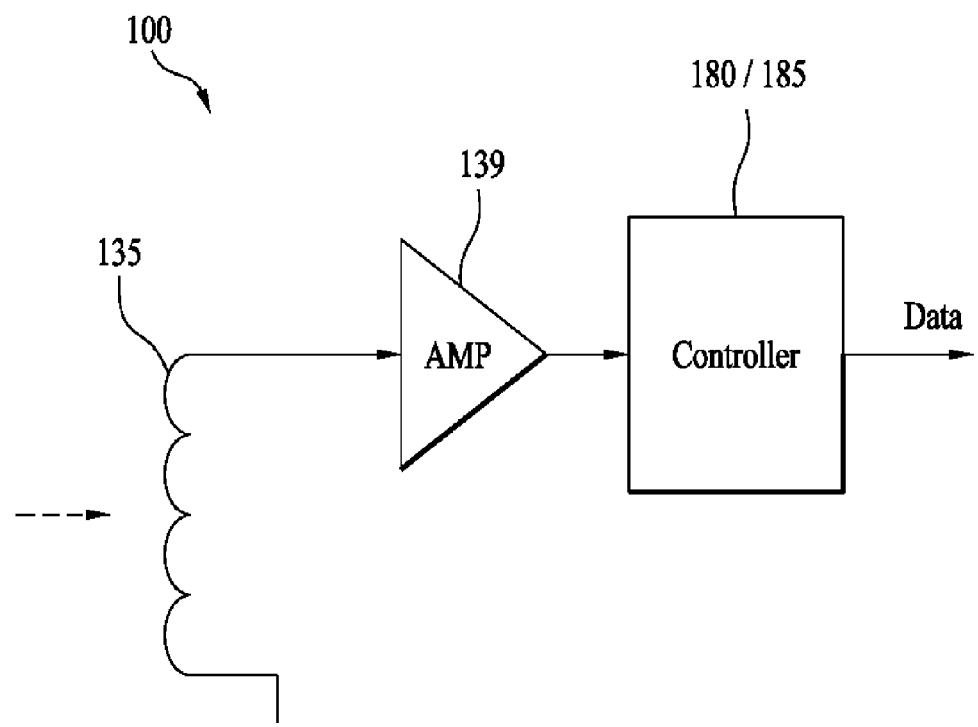

[Fig. 13]
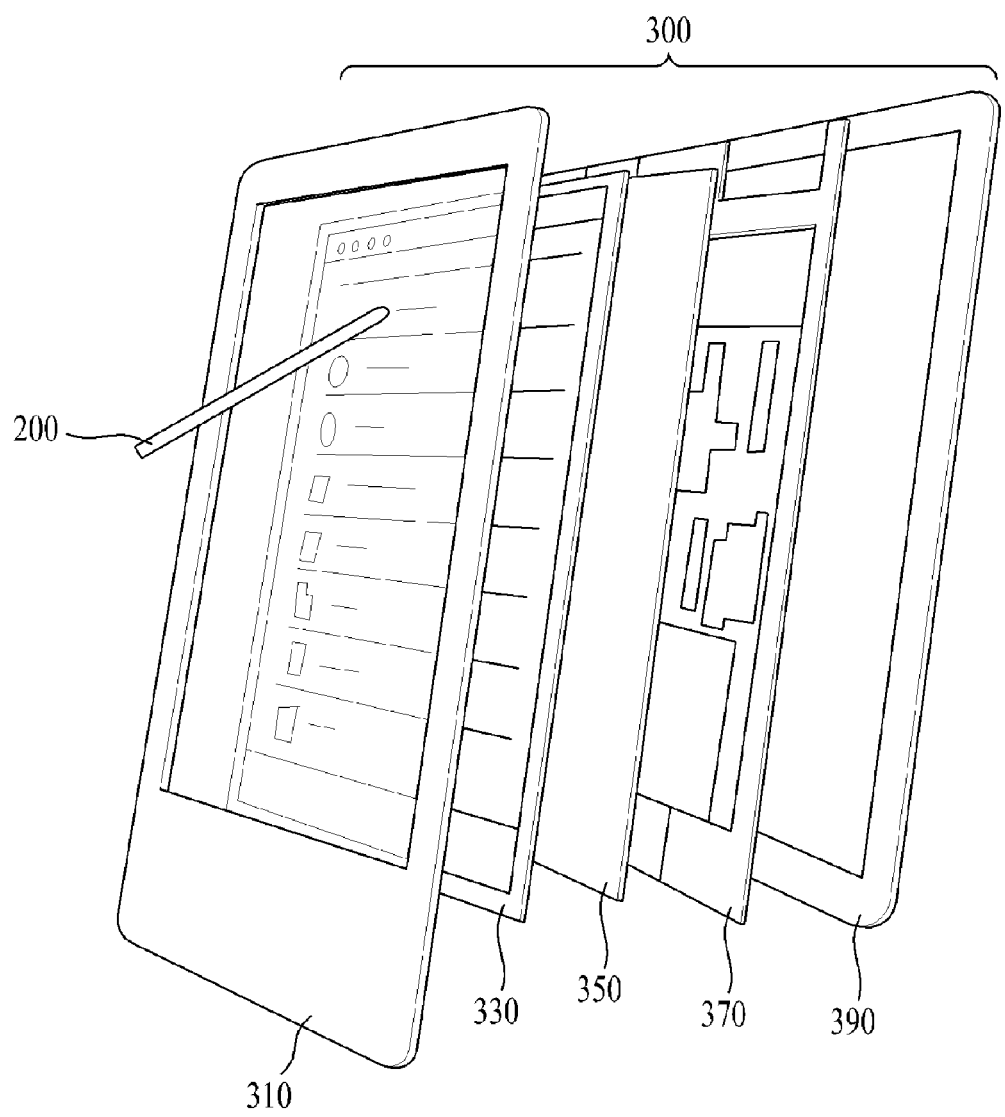

TOUCH PANEL AND A WIRELESS INPUT APPARATUS AND MOBILE TERMINAL INCLUDING TOUCH PANEL

CROSS REFERENCE TO RELATED APPLICATIONS

This application is the National Phase of PCT International Application No. PCT/KR2014/005348, filed on Jun. 18, 2014, which claims priority under 35 U.S.C. 119(a) to Korean application Nos. 10-2013-0112707, filed on Sep. 23, 2013 and 10-2014-0032522, filed on Mar. 20, 2014, all of which are hereby expressly incorporated by reference into the present application.

TECHNICAL FIELD

Embodiments of the present invention relate to a touch panel, a mobile terminal and a wireless input apparatus, more particularly, to a touch panel having a magnetic field generation unit having an improved vibration effect of a motor.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Especially, a touch panel is broadly used as a user interface in a major home appliance such as a computer, a mobile phone, a personal portable media player and a refrigerator. As a recent trend of reducing a weight and a thickness of a mobile phone, there are increasing demands on technology for enlarging a display area. The touch panel is required to have a function as a display as well as a simple function as a user interface. Accordingly, a terminal having a touch panel having an enhanced function is required.

SUMMARY OF THE INVENTION

Accordingly, an object of the present invention is to address the above-noted and other problems.

To overcome the disadvantages, an object of the present disclosure is to provide a touch panel which may provide a power to a wireless input apparatus wirelessly and a mobile terminal including the touch panel.

Another object of the present disclosure is to provide a touch panel which may determine a level of the pressure applied to a front end of a wireless input apparatus and presence of touch on a touch panel and a wireless input apparatus, and a mobile terminal including the touch panel.

A further object of the present disclosure is to provide a wireless input apparatus applied to the touch panel and the mobile terminal proposed above.

To achieve these objects and other advantages and in accordance with the purpose of the embodiments, as embodied and broadly described herein, a touch panel includes a cover unit having a touchable front surface and a rear surface opposite to the front surface; a touch sensing unit provided under the back surface to sense a preset touch signal; and a magnetic field generation unit provided under edges of the touch sensing unit to generate a magnetic field.

The touch sensing unit may include an electrode unit and a trace unit.

The electrode unit may include a first electrode unit having a first pattern and a second electrode unit having an electrode having a second pattern.

The trace unit may include a first trace unit connected to the first electrode unit and a second trace unit.

The magnetic field generation unit may include a loop coil provided under an edge of the touch sensing unit.

The magnetic field generation unit may generate and outputs a resonance power, using a magnetic field with a specific resonance frequency.

In another aspect, an wireless input apparatus include a front end for outputting an electric field; a pressure sensor for sensing a pressure applied to the front end; a signal output unit for generating a pulse signal having a different interval based on the output of the pressure sensor and providing the generated pulse signals to the front end.

The wireless input apparatus may further include a coil for receiving a power provided from the touch panel.

The coil may receive the power from the loop coil provided in an edge of the touch panel.

The coil may have the same resonance frequency as the loop coil.

The pressure sensor may sense the pressure applied to the front end based on a resistive of the pressure sensor which is changeable based on a strength of a magnetic field generated in the coil.

The pressure sensor may sense the pressure applied to the front end based on a resistive of the pressure sensor which is changeable based on a distance with the coil.

The front end may output an electric field having the pulse signal.

In a further aspect, a mobile terminal includes a magnetic field generation unit provided in an edge of the touch panel to provide a power to a wireless input apparatus; a touch sensing unit for sensing a signal output from the wireless input apparatus; and a controller for determining a pressure applied to a front end of the wireless input apparatus based on an interval of the sensed signal.

The magnetic field generation unit may be provided under an edge of the touch sensing unit.

The magnetic field generation unit may generate the power, using a magnetic field with a specific resonance frequency.

The controller may determine presence of contact between the touch panel and the wireless input apparatus based on an interval of the sensed signal.

The controller may determine a location of the wireless input apparatus on the touch panel, using the size of the sensed signal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

In at least one embodiment of the disclosure, the wireless input apparatus such as the touch pen may be provided with the power, using the loop coil formed in a preset portion of the touch panel, even though the wireless input apparatus includes the power supply device or the charging element are not provided.

In at least one of the embodiments mentioned above, presence of touch between the wireless input apparatus and the touch panel and also a level of the pressure applied to the front end of the wireless input apparatus may be determined.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

FIG. 1 is a block diagram of a mobile terminal in accordance with the present disclosure;

FIGS. 2a and 2b are schematic perspective diagrams of a touch panel in accordance with the present disclosure;

FIGS. 3a and 3b are diagram illustrating a touch sensing unit in accordance with the disclosure;

FIG. 4 is a sectional diagram illustrating a touch panel in accordance with the disclosure;

FIG. 5 is a diagram illustrating a touch panel and a controller associated with the touch panel in accordance with the disclosure;

FIGS. 6 and 7 are diagrams illustrating a principle of enabling a magnetic field and an electrode unit to recognize a touch signal;

FIG. 8 is a schematic diagram partially illustrating a touch panel and a wireless input apparatus in accordance with the disclosure;

FIGS. 9a and 9b are diagrams illustrating one example of a wireless input apparatus in accordance with the disclosure;

FIGS. 10a and 10b are diagrams illustrating another example of a wireless input apparatus in accordance with the disclosure;

FIG. 11 is a diagram illustrating examples of a signal output from a wireless input apparatus in accordance with the disclosure;

FIG. 12 is a diagram partially illustrating a mobile terminal in accordance with the disclosure; and FIG. 13 is a diagram illustrating a mobile terminal in accordance with the disclosure which is a digitizer and a power receiver which is a touch pen.

DETAILED DESCRIPTION OF EMBODIMENTS
OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIG. 1, where FIG. 1 is a block diagram of a mobile terminal in accordance with the present disclosure.

The mobile terminal 100 is shown having components such as a wireless communication unit 110, an input unit 120, a touch panel 130, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The touch panel 130 may be called a touch screen and it may be a kind of a signal input unit for generating input data for the user to control the operation of the mobile terminal. Although not shown in the drawings, the mobile terminal in accordance with the disclosure may further include a key pad, a dome switch, a jog wheel and a jog switch rather than the touch panel 130 as the user input unit.

The touch panel 130 may be configured to convert a pressure applied to a specific area of the display or change in the capacitance generated in a specific area of the display 151 into an electric input signal. The touch panel 130 may be configured to detect a location, an area and even a pressure of the touch. In case there is a touch input on the touch panel 130, a signal(s) corresponding to the touch input may be transmitted to a touch controller. Such a touch controller processes the signal(s) and transmits data corresponding to the controller 180. Accordingly, the controller 180 may recognize which area of the display 151 is touched.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, an alarm module 153, a haptic module 154, and an optical output module 155.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

The alarm module 153 outputs a signal for noticing the event generated in the mobile terminal 100. Examples of the event generated in the mobile terminal 100 include signal reception, message reception, key signal input and touch input. The alarm module 153 may output a signal for noticing event generation via vibration as well as a video signal and an audio signal. The video signal and audio signal may be output via the display 151 or the audio output module 152 and the signals 151 and 152 may be provided as elements for the alarm module 153.

A haptic module 154 can be configured to generate various tactile effects that a user feels, perceive, or otherwise experience. A typical example of a tactile effect generated by the haptic module 154 is vibration. The strength, pattern and the like of the vibration generated by the haptic module 154 can be controlled by user selection or setting by the controller. For example, the haptic module 154 may output different vibrations in a combining manner or a sequential manner.

Besides vibration, the haptic module 154 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 154 can also be implemented to allow the user to feel a tactile effect through a muscle sensation such as the user's fingers or arm, as well as transferring the tactile effect through direct contact. Two or more haptic modules 154 may be provided according to the particular configuration of the mobile terminal 100.

An optical output module 155 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 155 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. For example, the controller 180 may include a multimedia module 183 for replaying multimedia, a graphic module 182 for controlling graphic means displayed on a standby screen or graphic effects which can be displayed on a standby screen, and a graphic user interface module 181 for controlling a state to be changed based on a mutual operation between graphic user interfaces or another graphic user interface to communicate there with. In this instance, the multimedia module 183, the graphic module 182 and the graphic user interface module 181 may be realized in the controller 180 or they may be realized, independent from the controller 180.

In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1 is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract and analyze location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

FIGS. 2a and 2b are schematic perspective diagrams of the touch panel 130 in accordance with the disclosure and a magnetic generation unit 137. As shown in FIG. 2a, the touch panel 130 in accordance with the disclosure may include a cover unit 131, a touch sensing unit 135 and a magnetic field generation unit 137.

The cover unit 131 is provided in a surface of the touch panel 130 to protect the touch panel from outside. It is possible for the user a touch pen to input touch through a front surface of the cover unit 131. In this instance, the cover unit 131 may be formed of plastic or glass (e.g., Plexiglass and PET).

The touch sensing unit 135 may be provided in a back surface of the cover unit 131. A transparent adhesive film may be provided between the cover unit 131 and the touch sensing unit 135. The transparent adhesive film may be OCA (Optical Clear Adhesive).

The magnetic field generation unit 137 may be provided in a lower end of the touch sensing unit 135. As shown in FIG. 2b, the magnetic field generation unit 137 may include one or more loop coils provided around a circumference of the touch sensing unit 135 to generate a magnetic field. It is preferred that the one or more loop coils are provided under a second sensing region 135d in which a trace of the touch sensing unit 135 is provided.

FIGS. 3a and 3b are diagrams illustrating the touch sensing unit 135. As shown in FIG. 3a, the touch sensing unit 135 includes traces 135a and 135b, a first sensing region 135c and a second sensing region 135d. The traces 135a and 135b are located in the second region 135d and they electrically connect a predetermined electrode and a touch controller 185 with each other. The second sensing region 135d may be located outside the first sensing region 135c.

The first sensing region 135c may be provided a first electrode unit X1, X2, X3, X4, X5, X6 and X7 having a plurality of first patterned electrodes and a second electrode unit Y1, Y2, Y3, Y4, Y5, Y6 and Y7 having a plurality of second patterned electrodes. In this instance, the first electrode unit X1, X2, X3, X4, X5, X6 and X7 and the second electrode unit Y1, Y2, Y3, Y4, Y5, Y6 and Y7 may include electrodes X1, X2, X3, X4, X5, X6 and X7 and Y1, Y2, Y3, Y4, Y5, Y6 and Y7, respectively. Each of the electrodes may be formed of a conductive material. Examples of the conductive material include ITO (Indium Tin Oxide) and copper.

The electrode unit provided in the touch panel 130 in accordance with the disclosure may sense a touch signal based on a self-capacitance method and a mutual-capacitance. In the self-capacitance method, an electrode corresponding to a basic pixel performs both functions of transmission and reception to recognize touch. In the mutual-capacitance method, each of electrodes performs one of the functions of reception and transmission, using capacitance between two electrodes, and an electrode unit may be provided as at least two layers. Based on such methods, the electrode unit may sense not only contact touch directly input on the touch panel 130 by the user or pen but also proximity touch input by a touch input tool spaced apart a predetermined distance from a touch panel 130, without direct touch, and transmit a sensing signal to the touch controller 185 through the traces 135a and 135b.

The first electrode unit and the second electrode unit may be provided in the first sensing unit 135c, with specific patterns different from each other. The electrode units may have diverse patterns. In FIG. 3a, a lattice-structured pattern is shown as one example that electrodes X1, X2, X3, X4, X5, X6 and X7 of the first electrode unit are arranged along a vertical axis and electrodes Y1, Y2, Y3, Y4, Y5, Y6 and Y7 of the second electrode unit are arranged along a horizontal axis.

FIG. 3b is a sectional diagram of the first sensing region 135c. In other words, the first sensing region 135c having the first electrode unit and the second electrode unit may be provided in a first layer where the second electrode unit Y1, Y2, Y3, Y4, Y5, Y6 and Y7 are adjacent to the cover unit 131. The electrodes X1, X2, X3, X4, X5, X6 and X7 may be provided in a second layer, intersecting the electrodes of the second electrode unit. An insulation unit 135e may be provided between the first and second electrode units to insulate the first electrode unit and the second electrode unit from each other electrically. Meanwhile, in the self-capacitance method, a first electrode unit or a second electrode unit are provided is provided on layer selectively and an insulation unit 135e ma be provided between the electrodes.

The traces may include a first trace unit 135b for connecting the first electrode unit and the touch controller 185 with connecting the first electrode unit and the touch controller 185 with each other and a second trace unit 135a for connecting the second electrode unit and the touch controller 185 with each other. The traces may be provided in the second sensing region 135d mentioned above and the second sensing region 135d is corresponding to a bezel of the touch panel 130. In this instance, it is shown in FIG. 3a that ports for connecting the first trace unit 135b and the second trace unit 135a to the touch controller 185 are provided are provided in different lateral surfaces of the touch panel 130, respectively.

In case the touch panel 130 is used as a touch screen 130 having the function of the display 151 provided in the mobile terminal 100, the second sensing region 135d is corresponding to a bezel of the mobile terminal. At this time, traces are formed of a material having a high conductivity (e.g., silver and metal).

Meanwhile, the magnetic field generation unit 137 may be formed under the touch sensing unit 135. In case the touch panel 130 is rectangular-shaped as shown in FIG. 2a, a loop coil of the magnetic field generation unit 137 may be provided in a rectangular shape equal to a shape of an edge region of the touch panel 130, in other words, a bezel. However, the shape of the loop coil is not limited thereto and it may be determined based on the shape of the touch panel 130 or as an independent shape. An insulation layer is provided between the loop coil and the touch sensing unit 135 and they may be electrically independent from each other. At this time, the insulation layer may be a transparent adhesive film having adhesive elements as well as an insulation function and examples of the transparent adhesive film may include OCA (Optical Clear Adhesive). Although not shown in the drawings, not only the insulation layer but also a magnetic field blocking unit may be selectively provided near the loop coils to cover a predetermined lateral surface of the loop coils, spaced apart a predetermined distance. The magnetic field blocking unit may be formed of a material having a high transparency (e.g., ferrite and sandust).

The touch panel 130 may further include a power supply unit 132 and a capacitor 134 to generate a magnetic field in the magnetic field generation unit 137 as shown in FIG. 8, which will be described in detail later.

FIG. 4 is a sectional diagram of the touch panel 130 in accordance with the disclosure. In the sectional diagram of the touch panel 130 mentioned above, the cover unit 131 may be provided in a top of the touch panel 130 and the touch sensing unit 135 having the first sensing region 135c and the second sensing region 135d may be provided under the cover unit 131. Also, the magnetic field generation unit 137 may be provided under the second sensing region 153d.

FIG. 5 is a diagram illustrating the touch panel 130 and the controller 180 associated with the touch panel 130. The controller 180 in accordance with the disclosure may include a touch controller 185 for detecting a touch signal input from the touch panel 130 and transmitting the input touch signal to the controller 180. The touch controller 185 may be electrically connected to electrodes of the electrode unit through traces 135a and 135b, to determine at least one of a touch location, a touch pressure and a touch sensibility of the touch signal sensed by the electrode unit. The touch controller 185 may include a flexible printed circuit board (FPCB) for the touch screen 130 to determine at least one of the touch location and the touch sensibility of the touch signal.

The controller 180 may receive a touch result signal from the touch controller 185 and control each of the elements provided in the mobile terminal 100 to perform a corresponding operation to the received touch result signal. For instance, when the touch result signal is corresponding to a command signal for implementing a specific program, for instance, a music program, the controller 180 may implement a corresponding music program.

Hereinafter, a control method which may be realized in the mobile terminal structured as mentioned above and related embodiments will be described, referring to the accompanying drawings. It is obvious to those skilled in the art that the disclosure is modified in other specific types.

FIG. 6a illustrates one example of a method for sensing a touch signal based on the self-capacitance method. FIG. 7 illustrates a principle of the magnetic field generation unit 137 and the electrode unit recognizing the touch signal. FIG. 6a and FIG. 7 illustrates that a first electrode unit X0, X1, X2 and X3 and a second electrode unit Y0, Y1, Y2 and Y3 are provided as one example.

Based on the self-capacitance method, capacitance values of all electrodes X0, X1, X2, X3, Y0, Y1, Y2 and Y3 corresponding to entire rows and columns are measured to sense change in capacitances of the electrodes. In other words, when a touch signal is generated in the touch sensing unit 135 having a preset pattern shown in FIG. 7 by the user's finger or the pen, a capacitance of an electrode corresponding to the location where the touch signal is generated is changed. Accordingly, the location of the touch signal may be determined based on change in the capacitances. Each of the electrodes performs functions of both transmission (Tx) and reception (Rx). Touch sensing in the first electrode unit X0, X1, X2 and X3 is independent from touch sensing in the second electrode unit Y0, Y1, Y2 and Y3.

As shown in FIG. 6a, when the user performs multi-touch on (X2, Y0) and (X1 and Y3) based on the self-capacitance method, the touch controller 185 determines that an electrode corresponding to X1, X2, Y0 and Y3 is touched. However, there might be an error of the touch controller 185 failure in recognizing a multi-touch signal in case of the self-capacitance method. When the multi touch is moving along a predetermined direction, the touch controller 185 may recognize a direction of touch and a plurality of touch signals and gestures.

In one embodiment of the disclosure, a loop coil of the magnetic field generation unit 137 may sense a touch signal together with the electrode of the electrode unit. Even without using the electrode unit, the magnetic field generation unit 137 may sense the touch signal.

In case of the self-capacitance, the loop coil of the magnetic field generation unit 137 may perform both function of transmission (Tx) and reception (Rx). In other words, to sense a touch signal from the magnetic field generation unit 137, the touch controller 185 may transmit a transmission signal (Tx) to the loop coil of the magnetic field and receive a reception signal (Rx) from the loop coil. Then, when a touch input is performed within a preset distance from the loop coil, a magnetic field having a preset level is generated in the loop coil and the touch controller 185 electrically connected to the magnetic field generation unit 137 may be determined whether a touch input is performed within a preset distance from the magnetic field generation unit 137 based on the level of the generated magnetic field. At this time, when a voltage level of the transmission signal (Tx) input to the loop coil is heightened, the level of the magnetic field generated in the loop coil can be also heightened and a touch distance which can be recognized by the touch controller 185 can be increased.

As mentioned above, the magnetic field generation unit 137 may be provided under the second sensing region 135*d* having no electrode unit, in other words, a bezel region. The mobile terminal 100 in accordance with the disclosure may recognize a touch input to the bezel region, even though no auxiliary electrode unit is provided. For instance, when a bezel is located in four edges around the touch panel 130 and the magnetic field generation unit 137 is located in the corresponding bezel region, the touch controller 185 may recognize touch generated in any portions of the bezel. In addition, the touch controller 185 may recognize proximity touch as well as contact touch on the bezel region.

FIG. 6*b* illustrates one example of a method for sensing a touch signal in accordance with the mutual capacitance method. In FIG. 6, a first electrode unit X0, X1, X2 and X3 and a second electrode unit Y0, Y1, Y2 and Y3 are provided.

As shown in FIG. 6*b*, in the mutual capacitance method, change in capacitances in the first electrode unit X0, X1, X2 and X3 as transmission electrode and capacitances in a second electrode unit Y0, Y1, Y2 and Y3 as reception electrode may be sensed. In other words, in the mutual capacitance method different from the self-capacitance method, each of the electrodes performs one function of transmission (Tx) or reception (Rx) and each touch signal may be recognized from a single coordinate such as (X, Y). Specifically, in the mutual capacitance method, when the user performs multi touch of (X2, Y0) and (X1, Y3), the touch controller 185 may recognize X2 as a transmission electrode and Y0 as a reception electrode corresponding to x2. Also, the touch controller 185 may recognize X1 as a transmission electrode and Y3 as a reception electrode corresponding to X1. Based on the mutual capacitance method, the touch controller 185 may recognize the multi touch signal, without errors. When the multi touch is moving along a preset direction, the touch controller 185 may recognize the touch direction and also a plurality of touch signals and gestures.

The loop coil of the magnetic field generation unit 137 may sense the touch signal together with the electrodes of the electrode unit and also the touch signal, even without using the electrode unit.

In one embodiment of the disclosure, a loop coil may be used as a transmission electrode as mentioned in the mutual capacitance method and one of the electrodes provided in the first sensing region 135*c* may be operated as a reception electrode. In this instance, a region where a touch signal can be sensed, using the magnetic field generation unit 137 may be enlarged and the touch controller 185 may determine whether a touch signal is sensed on a front surface of the touch panel 130. The touch controller 185 may also determine proximity touch as well as contact touch. In other words, in the mutual capacitance method, the touch panel 130 may include an analog digital converter (ADC) having a high resolving power. Also, the touch panel 130 may uses a sensor of the first sensing region 135*c* as a reception electrode and a loop coil as a transmission electrode, such that a range of change values recognized in magnetic field values by the touch controller 185 through the loop coil can be enlarged.

As mentioned above, the touch controller 185 may determine whether a touch signal is input on a preset region of the bezel through the magnetic field generation unit 137 provided in the bezel region of the touch panel 130. Accordingly, the touch panel in accordance with the disclosure may include the loop coil and the touch panel 130 may enlarge the touch panel 130, in other words, the region where the touch signal can be sensed in the mobile terminal 100.

FIG. 8 is a circuit diagram illustrating one example that the magnetic field generation unit 137 is used together with a wireless input apparatus 200. Here, the magnetic field generation unit 137 is used as a power supply source. Elements provided in the wireless input apparatus 200 shown in FIG. 8 are functioned as power receivers. Those power receivers may be provided in another device as well as in the wireless input apparatus 200.

As shown in FIG. 8, the magnetic field generation unit 137 has a loop coil (LTx) and the loop coil (LTx) is connected to a preset capacitor 134. The loop coil (LTx) and the capacitor 134 may generate a resonance power based on resonance coupling, such that the power can be supplied to the power supply unit 132. Based on the resonance coupling, a resonance frequency is applied to the loop coil (LTx) and EMR (Electromagnetic radiation), in other words, a predetermined amount of magnetic field change is generated, to be applied to a coil (LRx) of the wireless input apparatus 200 having the same resonance frequency. In accordance with this method, when the loop coil (LTx) and the coil (LRx) are resonant at the same resonance frequency, the power generated in the loop coil (LTx) is transmitted to the coil (LRx) wirelessly. In other words, when the touch panel 130 having the loop coil (LTx) and the wireless input apparatus 200 having the coil (LRx) are located in a preset distance from the mobile terminal 100 in case they are resonant at the same frequency, the power can be supplied to the wireless input apparatus 200.

Especially, based on the resonance coupling as shown in following Mathematic Formula 1, a resonance frequency (f0) is determined based on a capacitance (C) determined by an inductance (L) and a distance of a capacitance. The inductance (L) is determined based on a distance, a length, a rotational number between the loop coils (LTx).

$$f_0 = \frac{1}{2\pi\sqrt{L_{Tx}C_{Tx}}} \qquad \text{[Mathematic Formula 1]}$$

Meanwhile, the controller 180 may recognize presence of a preset wireless input apparatus 200 within a preset range. Once determining the presence of the wireless input apparatus 200, the controller 180 may supply the power to the magnetic field generation unit 137 and generate a preset wireless power. The controller 180 may control the generated wireless power transmitted to the wireless input apparatus 200.

Specifically, when recognizing presence of a wireless input apparatus 200 within a preset range, the controller 180 may make a request for information associated with charging to the wireless input apparatus 200. After that, the wireless input apparatus 200 may transmit charging-related information required for charging (e.g., a power remaining state, a voltage of a resonance power, a current and a resonance frequency required for charging) to the mobile terminal 100. The controller 180 may determine whether to transmit the wireless power to the mobile terminal through the magnetic field generation unit 137 based on the received charging-related information. When charging is required based on the result of the determination, the controller 180 may control the magnetic field generation unit 137 to transmit a wireless power having a preset resonance frequency. While transmitting the wireless power, the power receiving apparatus senses whether to complete the charging. When the charging is completed based on the result of the determination, the controller 180 may transmit a charging end signal for noticing end of the charging to the mobile terminal 100. The controller 180 receiving that signal may control the magnetic field generation unit 137 to stop the generation and transmission of the wireless power.

FIGS. 9a and 9b are diagrams illustrating one example of a pen type wireless input apparatus 200 in accordance with the disclosure. As shown in FIG. 9a, a wireless input apparatus 200 includes a pen front end 201, a pressure sensor 202, a coil LRx 203, a signal generation unit 204 and a case 205. As shown in FIG. 9b, the wireless input apparatus 200 may further include an amplification unit 206 and one or more capacitors. The elements shown in FIGS. 9a and 9b are not necessary and a wireless input device 200 having more or less elements may be realized.

The pen front end 201 is configured to be touched on the touch panel 130 and outputs an electric field for generating a touch signal. The pen front end 201 is configured to move toward the case 205, as a distance with the touch panel is getting closer and closer in a state of contacting with the touch panel 130. Also, the pen front end 201 may be used as an antenna for transmitting the signal generated in the signal generation unit 204 to the electrodes of the touch sensing unit 135.

The pressure sensor 202 senses a pressure applied between the pen front end 201 and the touch panel 130. The pressure sensor 202 responds to movement of the pen front end 201 or the coil 203. For instance, the pressure sensor 202 shown in FIG. 9a may outputs a voltage for controlling the signal generation unit 204 based on a physical pressure applied by the pen front end 201. The pressure sensor 202 is provided between the pen front end 201 and the coil 203 and the position of the pressure sensor 202 is not limited thereto.

As another example, the pressure sensor may be a GMR (Giant Magnetro Resistive) sensor. The GMR sensor may sense a pressure applied to the pen front end 201 based on a resistive of the pressure sensor 202a changed based on a distance with the coil 203, in other words, the pressure sensor 202a may be configured to respond to a location/movement of the coil 203. A signal output from the pressure sensor 202a may be amplified by the amplification unit 206 and transmitted to the signal generation unit 204.

The coil 203 has the same resonance frequency as the loop coil to receive the resonance power provided from the loop coil. The coil 203 may be configured to move within the case 205 along the movement of the pen front end 201. For instance, as the pen front end 201 is getting closer and closer to the case 205, the coil 203 may move toward a back of the case 205.

The signal generation unit 204 may generate pulse signals having different intervals based on the output of the pressure sensor 202 and transmit the generated pulse signal to the pen front end 201. FIG. 11 shows a pulse signal generated when a distance between the pen front end 201 and the touch panel 130 is 5 mm, with no pressure applied to the pend front end 201 and a pulse signal output from the signal generation unit 204 when the pen front end 201 is in contact with the touch panel 130. As shown in FIG. 11, the signal generation unit 204 outputs the pulse signal having a relatively long pulse interval. Also, the signal generation unit 204 may output a pulse signal having a longer interval, as the pressure applied to the pen front end 201 is getting larger.

FIG. 12 is a diagram partially illustrating the mobile terminal 100. As shown in FIG. 12, the touch sensing unit 135 senses the pulse signal output through the electric field from the pen front end 201. The amplification unit 139 amplifies the signal output from the touch sensing unit 135 and provides the amplified signal to the controller 180 or the touch controller 185.

The controller 180 or the touch controller 185 senses a level of the pressure applied to the pen front end 201 as well as presence of contact between the pen front end 201 and the touch panel 130 based on the interval of the signal sensed by the touch sensing unit 135. For instance, when the internal of the sensed signal is a preset reference or less, the controller 180 or the touch controller 185 determines that the pen front end 201 does not contact with the touch panel 130. In contrast, when the interval of the sensed signal reaches the reference value, the controller or the touch controller 185 determines that the pen front end 201 contacts with the touch panel 130. When the internal of the sensed signal is over the preset reference, the controller 180 or the touch controller 185 determines that the pressure applied to the pen front end 201 is getting stronger.

The controller 180 or the touch controller 185 may determine the location of wireless input apparatus 200 on the touch panel 130, using a magnitude of the sensed signal. In other words, when the pen front end 201 is getting closer to the touch sensing, a signal sensed by an electrode located nearest to the pen front end 201 is relatively getting larger and the location of the electrode unit the closest to the pen front end 201 based on the size of the sensed signal and the location of the pen front end 201 can be determined, using the location of the nearest electrode.

FIG. 13 is a diagram illustrating a mobile terminal in accordance with the disclosure which is a digitizer and a power receiver which is a touch pen.

The coil (LRx) shown in FIG. 13 is provided in the touch pen 200. Even though no elements for charging and operations are provided, the power can be supplied to the touch pen while the user is using the touch pen to input touch, like the resonance coupling.

Meanwhile, the digitizer 300 may include a front case 310, a display 330, a touch recognition unit 350, a mother board 370 having a controller 180 and a rear case 290. Here, the loop coil (LTx) mentioned above may be provided in a bezel of the digitizer and it may be provided in an edge portion of a back surface of the touch recognition unit 850 or other portions.

In one embodiment of the disclosure, the display 330 may include EPD (Electronic Paper Display). The touch recognition unit 350 may include ERT (Electromagnetic Resonance Touch). The shape and size of the loop coil and the number of the loop coils provided in the magnetic field generation unit 137 may be determined, considering power transmission and sensitivity as well as the thickness of the bezel. The touch panel in accordance with the disclosure may include a touch screen panel functioned as a display.

In at least one of the embodiments mentioned above, the wireless input apparatus such as the touch pen may be provided with the power, using the loop coil formed in a preset portion of the touch panel, even though the wireless input apparatus includes the power supply device or the charging element are not provided.

In at least one of the embodiments mentioned above, presence of touch between the wireless input apparatus and the touch panel and also a level of the pressure applied to the front end of the wireless input apparatus may be determined.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A mobile terminal comprising:
a touch panel comprising a magnetic field generation unit and a touch sensing unit,
wherein the magnetic field generation unit comprises a loop coil which is provided in an edge of the touch panel, and the magnetic field generation unit is configured to generate a wireless power using a magnetic field with a specific resonance frequency, and provide the wireless power to a wireless input apparatus,
wherein the touch sensing unit is configured to sense a signal output from the wireless input apparatus; and
a controller configured to:
receive a charging-related information from the wireless input apparatus,
determine whether to transmit the wireless power to the wireless input apparatus through the magnetic field generation unit based on the received charging-related information, and
control the magnetic field generation unit to transmit the wireless power having the specific resonance frequency,
wherein the touch sensing unit comprises an electrode unit located in a first sensing region and a trace unit located in a second sensing region,
wherein the second sensing region locates outside the first sensing region,
wherein the loop coil senses a touch signal together with the electrode unit, and
wherein the loop coil is used as a transmission electrode and the electrode unit located in the first sensing region is used as a reception electrode.

2. The mobile terminal of claim 1, wherein the magnetic field generation unit is provided under an edge of the touch sensing unit.

3. The mobile terminal of claim 1, wherein the controller determines presence of contact between the touch panel and the wireless input apparatus, and a pressure applied to a front end of the wireless input apparatus based on an interval of the sensed signal.

4. The mobile terminal of claim 1, wherein the controller determines a location of the wireless input apparatus on the touch panel, using a size of the sensed signal.

5. The mobile terminal of claim 1, wherein the electrode unit comprises a first electrode unit having a first pattern and a second electrode unit having a second pattern.

6. The mobile terminal of claim 5, wherein the trace unit comprises a first trace unit connected to the first electrode unit and a second trace unit.

* * * * *